Patented May 2, 1933

1,906,230

UNITED STATES PATENT OFFICE

ERNST KORTEN, OF FRANKFORT-ON-THE-MAIN-FECHENHEIM, GERMANY, ASSIGNOR TO GENERAL ANILINE WORKS, INC., OF NEW YORK, N. Y., A CORPORATION OF DELAWARE

AMINODERIVATIVES OF HEXAHYDRODIPHENYL AND PROCESS OF MAKING SAME

No Drawing. Application filed February 28, 1929, Serial No. 343,570, and in Germany March 2, 1928.

I have found that the three-nuclear condensation products which correspond probably to the general formula:

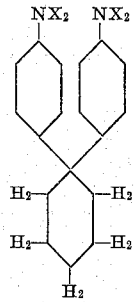

in which formula both X's are either hydrogen or methyl and one or more hydrogen atoms of the aromatic nuclei as well as of the hydroaromatic residue may be substituted by an alkyl or alkoxygroup, which products are obtained by condensing two molecules of aromatic amines at elevated temperatures with hydroaromatic ring ketones in the presence of an acid-condensing agent, are converted by a combined process into amino derivatives of hexahydrodiphenyl.

The new reaction runs in two phases. In the first phase the three-nuclear condensation products used as starting materials are decomposed and two-nuclear condensation products are formed being aminoderivatives of tetrahydrodiphenyl and corresponding probably to the general formula:

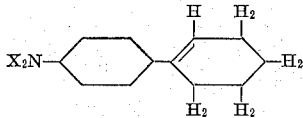

in which formula the X's mean hydrogen or an alkylgroup and one or more hydrogen atoms of the benzene as well as of the tetrahydrobenzene nucleus may be substituted by an alkyl- or alkoxy-group. This decomposition occurs when heating the three-nuclear condensation products at elevated temperatures.

The decomposition process is, as I have found, essentially favored by heating the starting materials in presence of suitable catalysts of decomposition, of the group consisting of mineral acids, acidic or easily dissociating salts of mineral acid. In some cases it may be an advantage to add a suitable diluent. One may work while applying raised pressure or in vacuo. In this manner at temperatures below 200° C. the aminoderivatives of tetrahydrodiphenyl are formed in a smooth reaction, whereas, when heating the three-nuclear condensation products in vacuo without the addition of such a catalyst, these three-nuclear products distill over without any decomposition.

In the second phase of my present process the isolated aminoderivatives of tetrahydrodiphenyl are treated with hydrogen under pressure in the presence of a base metal hydrogenation catalyst and advantageously with addition of a diluent, whereby the tetrahydrodiphenyl derivatives are entirely hydrogenated in the tetrahydrobenzene nucleus. Instead of the primary likewise the secondary or tertiary tetrahydrodiphenyl bases or the acylderivatives thereof can be subjected to the hydrogenation process. The absorption of hydrogen occurs in all cases very smoothly at temperatures below 100° C. The acylderivatives may be saponified in the usual manner after the hydrogenation process.

As base metal hydrogenation catalysts especially those are suitable containing a plurality of metals such as nickel, cobalt, copper or bismuth, advantageously precipitated as carbonates on silica gel as substratum and reduced in the usual manner in a hydrogen atmosphere.

But it is also possible to convert the three-nuclear condensation products of cyclohexanones and two molecules of arylamines into the aminoderivatives of hexahydrodiphenyl in one operation by treating the three-nuclear products immediately with hydrogen under pressure in the presence of a base metal catalyst, advantageously with addition of a suitable catalyst.

The aminoderivatives of hexahydrodiphenyl obtainable as specified above either in two phases or in one operation when starting from three-nuclear condensation products of cyclohexanones and two molecules of arylamines correspond probably to the general formula:

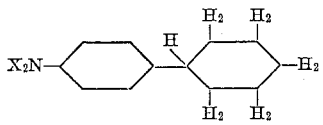

in which formula the X's mean hydrogen or an alkylgroup and one or more hydrogen atoms of the aromatic as well as of the hydroaromatic nucleus may be substituted by an alkyl- or alkoxy-group. The reaction products which contain at least one of such substituents in their molecule, are new compounds. The bases obtainable according to my new process are partly liquid, partly crystallizing solid substances; most of their salts of mineral acids are difficultly soluble. They are important intermediates for the production of new dyestuffs and pharmaceutical products.

Example 1

30 parts of 4.4'-diamino-diphenyl-cyclohexane, obtained by condensing one molecular proportion of cyclohexanone with two molecular proportions of aniline in the presence of hydrochloric acid, and an amount of hydrochloric acid of specific gravity 1.14 a little exceeding 2 molecular proportions are heated to 190–200° C. in an acid-proof closed vessel. After 3 hours heating the reaction product is made alkaline and fractionated in vacuo. First, some aniline having been split off distills over and then the new compound passes over between about 170° C. and 190° C. under a pressure of 12 mm. It may be purified as hydrochloric salt and is identical with 4-amino-2',3',4',5'-tetrahydro-1,1'-diphenyl.

86 parts of this compound are heated under a hydrogen pressure of 30–80 atmospheres while well stirring with 3.5 parts of a nickel containing catalyst previously reduced in a hydrogen atmosphere and suspended in 50 parts of decahydronaphthalene. The absorption of hydrogen occurs quickly at 60–70° and stops when the amount of hydrogen corresponding to 1 molecular proportion is introduced. The reaction product is filtered off from the catalyst and fractionated in vacuo. The fraction boiling at 166° under a pressure of 13 mm solidifies as long snow-white needles melting at 55–56°. It represents 4-amino-1,2',3',4',5',6'-hexahydro-1,1'-diphenyl of the probable formula:

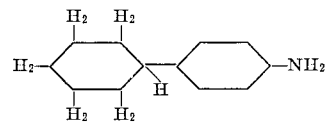

which is described by Kursanoff in Liebigs Annalen, vol. 318, page 321.

Example 2

50 parts of 4.4'-diamino-3.3'-dimethyl-diphenyl-cyclohexane obtained by condensing one molecular proportion of cyclohexanone with two molecular proportions of ortho-toluidine in the presence of hydrochloric acid and 10.5 parts of zirconium oxychloride of the formula $ZrOCl_2.8aq$ are heated in vacuo to 200–230°. After a short time a transparent oil begins to distill over. When the reaction is finished the residue of the distillation is dissolved in hot dilute hydrochloric acid, the solution is filtered, the filtrate is made alkaline and extracted with an organic solvent. This extraction mass and the distillate mentioned above are fractionated together in vacuo. After the ortho-toluidine split off has passed over the crude reaction product distills between 185–195°. This distillate is purified by means of its difficultly soluble hydrochloric salt. The 4-amino-3-methyl-2',3',4',5'-tetrahydro-1,1'-diphenyl thus obtained corresponds probably to the formula:

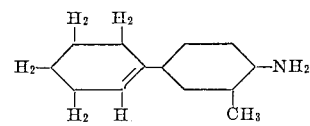

It represents a colorless oil boiling at 183–185° C. under a pressure of 15 mm. Its acetyl compound melts at 169–170° when recrystallized from glacial acetic acid or from methylalcohol.

30 parts of this amino-compound are heated as described in Example 1 with 1 part of a nickel-containing catalyst under a hydrogen pressure of 30–80 atmospheres. The absorption occurs in a short time at 60–80° C. The reaction mass is worked up according to Example 1 and yields thereby the new 4-amino-3-methyl-1',2',3',4',5',6'-hexahydro-1,1',-diphenyl of the probable formula:

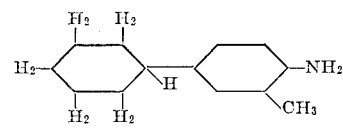

as a clear oil boiling at 175–177° under a pressure of 15 mm, solidifying below 0°.

The same compound is obtained by hydrogenating the above mentioned acetyl-compound and saponifying the 4-acetyl-amino-3-methyl-1',2',3',4',5',6'-hexahydro-1,1'-diphenyl.

*Example 3*

30 parts of 4.4'-diamino-3.3'-diphenyl-cyclohexane and 26.5 parts of sodium bisulfate are heated in vacuo to 120-240° C. The further process is carried out according to Example 2. In this manner the same tetrahydro- and hexahydro-compounds are obtained.

*Example 4*

40 parts of 4.4'-diamino-3.3'-dimethyl-diphenyl-cyclohexane and 13 parts of ammonium chloride are intimately mixed and the mixture is molten in an oil bath by heating it to 200-230° C. After about 1 hour the reaction mass is distilled in vacuo. The distillate is digested with dilute hydrochloric acid and separated from the white residue. From the hydrochloric salt the free tetrahydrodiphenyl base is obtained by adding alkali. It is identical with that described in Example 2 and yields when hydrogenated as there explained the same 4-amino-3-methyl-1',2',3',4',5',6'-hexahydro-1,1'-diphenyl.

*Example 5*

50 parts of 4.4'-diamino-3.3'-dimethyl-diphenyl-4" methyl-cyclohexane and 15 parts of anhydrous zinc chloride are fused in vacuo. The mass distills at about 180° C. under a pressure of 15 mm. The reaction is completed by heating to 220-240° C. (temperature of the bath). The reaction mass is worked up as described in Example 2. In this manner 4-amino-3.4'-dimethyl-2',3',4',5'-tetrahydro-1,1'-diphenyl of the formula:

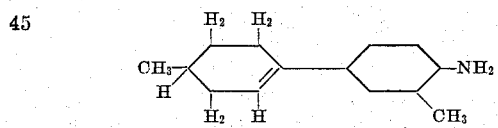

is obtained being a clear thick oil boiling at 194-196° C. under a pressure of 13 mm. Its mineral acids salts are very difficultly soluble. Its acetyl-compound crystallizes from glacial acetic acid or methylalcohol in fine needles melting at 163° C.

This tetrahydro-compound yields when hydrogenated as described in Example 2 the corresponding hexahydro-compound showing quite similar properties.

*Example 6*

4.4'-diamino-3.3'-dimethoxy-diphenyl-cyclohexane is converted into 4-amino-3-methoxy-2',3',4',5'-tetrahydro-1,1'-diphenyl for instance according to the foregoing examples.

57 parts of this tetrahydro-compound are heated with 40 parts of decahydronaphthalene and 2.5 parts of a hydrogenation catalyst previously reduced, in an autoclave provided with a stirrer under a hydrogen pressure of 50-80 atmospheres. The absorption of one molecular proportion of hydrogen occurs quickly at 80-100° C. The mass is worked up as described above and yields thereby the new 4-amino-3-methoxy-1',2',3',4',5',6'-hexahydro-1,1'-diphenyl of the probable formula:

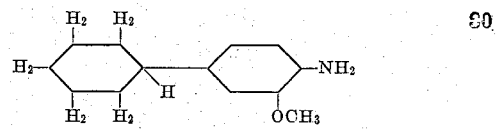

It represents when recrystallized from methylalcohol toluene or benzine large brilliant colorless scales melting at 107° C.

*Example 7*

4.4'-diamino-3.3'-dichloro-diphenyl-cyclohexane are converted into 4-amino-3-chloro-2',3',4',5'-tetrahydro-1,1'-diphenyl.

67 parts of this tetrahydro-compound and 2 parts of a reduced catalyst containing nickel and pumice are stirred under a hydrogen pressure of 30 atmospheres. The absorption of hydrogen begins at about 80° C. and stops when after about 1-2 hours one molecular proportion of hydrogen is taken up. The new 4-amino-3-chloro-1',2',3',4',5',6'-hexahydro-1,1'-diphenyl thus obtained corresponds probably to the formula:

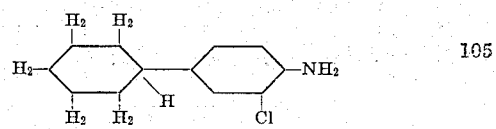

It represents a colorless oil of a scarcely basic character which boils at 186-187° C. under a pressure of 20 mm.

*Example 8*

383 parts of 4.4'-tetramethyl-diamino-diphenyl-cyclohexane and 115 parts of technical zinc chloride are fused in a suitable vessel provided with a stirrer. At about 230° C. the mass begins to boil and dimethyl-aniline passes over. The reaction product is fractionated in vacuo. After first runnings consisting of dimethylaniline 4-dimethylamino-2',3',4',5'-tetrahydro-1,1'-diphenyl passes over. It corresponds probably to the formula:

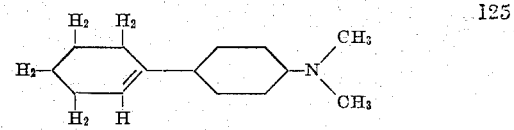

and represents an easily movable, nearly colorless oil of a stong blue fluorescence. Its hydrochloric salt is easily soluble.

This tetrahydro-compound yields when hydrogenated according to Example 1 the corresponding hexahydro-compound showing quite similar properties.

I claim:

1. A process which comprises heating three-nuclear condensation products probably of the general formula:

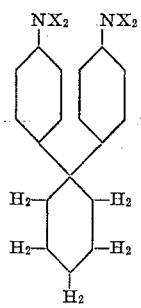

in which formula both X's are either hydrogen or methyl and one or more hydrogen atoms of the aromatic nuclei as well as of the hydroaromatic residue may be substituted by a methyl or methoxy group, in the presence of a catalyst of decomposition of the group consisting of hydrochloric acid, acidic or easily dissociating salts of hydrochloric acid yielding upon hydrolysis acidic. solutions, isolating the aminoderivatives of tetrahydrodiphenyl thus formed and treating them with hydrogen under pressure in the presence of a base metal hydrogenation catalyst.

2. A process which comprises heating three-nuclear condensation products probably of the general formula:

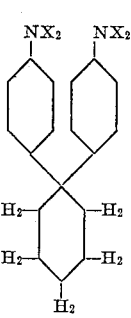

in which formula both X's are either hydrogen or methyl and one or more hydrogen atoms of the aromatic nuclei as well as of the hydroaromatic residue may be substituted by a methyl or methoxy group, in the presence of a catalyst of decomposition of the group consisting of hydrochloric acid, acidic or easily dissociating salts of hydrochloric acid yielding upon hydrolysis acidic solutions with addition of an inert diluent, isolating the aminoderivatives of tetra hydrodiphenyl thus formed and treating them with hydrogen under pressure in the presence of a base metal hydrogenation catalyst with addition of an inert diluent.

3. A process which comprises heating three-nuclear condensation products probably of the general formula:

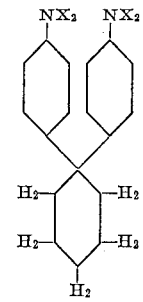

in which formula both X's are either hydrogen or methyl and at least one hydrogen atom of the aromatic nuclei or of the hydroaromatic residue is substituted by a methyl or methoxy group, in the presence of a catalyst of decomposition of the group consisting of hydrochloric acid, acidic or easily dissociating salts of hydrochloric acid yielding upon hydrolysis acidic solution, isolating the aminoderivatives of tetrahydrodiphenyl thus formed and treating them with hydrogen under pressure in presence of a base metal hydrogenation catalyst.

4. A process which comprises heating three-nuclear condensation products probably of the general formula:

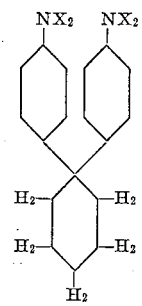

in which formula both X's are either hydrogen or methyl and at least one hydrogen atom of the aromatic nuclei or of the hydroaromatic residue is substituted by a methyl or methoxy group, in the presence of a catalyst of decomposition of the group consisting of hydrochloric acid, acidic or easily dissociating salts of hydrochloric acid yielding upon hydrolysis acidic solutions with addition of an inert diluent, isolating the aminoderivatives of tetrahydrodiphenyl thus formed and treating them with hydrogen under pressure in presence of a base metal hydrogenation catalyst with addition of an inert diluent.

5. In the process for producing aminoderivatives of cyclohexylbenzene the step which comprises heating three-nuclear condensation products probably of the general formula:

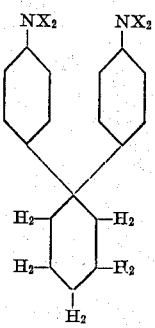

in which formula both X's are either hydrogen or methyl and one or more hydrogen atoms of the aromatic nuclei as well as of the hydroaromatic residue may be substituted by a methyl or methoxy group, in the presence of a catalyst of decomposition of the group consisting of hydrochloric acid, acidic or easily dissociating salts of hydrochloric acid yielding upon hydrolysis acidic solutions and isolating the aminoderivatives of tetrahydrodiphenyl thus formed.

6. In the process for producing aminoderivatives of cyclohexylbenzene the step which comprises heating three-nuclear condensation products probably of the general formula:

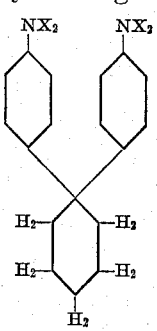

in which formula both X's are either hydrogen or methyl and one or more hydrogen atoms of the aromatic nuclei as well as of the hydroaromatic residue may be substituted by a methyl or methoxy group, in the presence of a catalyst of decomposition of the group consisting of hydrochloric acid, acidic or easily dissociating salts of hydrochloric acid yielding upon hydrolysis acidic solutions with addition of an inert diluent, and isolating the aminoderivatives of tetrahydrodiphenyl thus formed.

7. As new compounds aminoderivatives of hexahydrobenzene corresponding probably to the general formula:

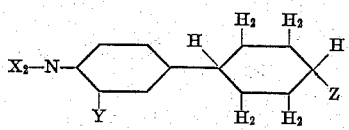

wherein both X's are either hydrogen or methyl, Y stands for chlorine, methyl or methoxy, Z for hydrogen or methyl, which compounds are partly liquid, partly crystallizing solid substances, forming mostly difficultly soluble salts of mineral acids.

8. As a new compound the 4-amino-3-methyl-1',2',3',4',5',6'-hexahydro-1,1'-diphenyl of the probable formula:

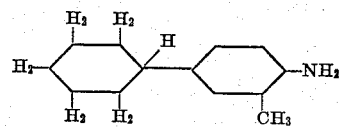

being in a pure state a transparent oil boiling at 175–177° C. under a pressure of 15 mm., solidifying below 0° C.

In testimony whereof, I affix my signature.
ERNST KORTEN.